(12) United States Patent
Ziskovsky

(10) Patent No.: US 11,770,041 B2
(45) Date of Patent: Sep. 26, 2023

(54) SYSTEMS AND METHOD FOR AN ELECTRIC MOTOR WITH MOLDED COOLANT JACKET AND SPRAY RING

(71) Applicant: Dana Heavy Vehicle Systems Group, LLC, Maumee, OH (US)

(72) Inventor: Darren J. Ziskovsky, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 262 days.

(21) Appl. No.: 17/138,692

(22) Filed: Dec. 30, 2020

(65) Prior Publication Data
US 2022/0209617 A1    Jun. 30, 2022

(51) Int. Cl.
*H02K 5/20* (2006.01)
*B60K 1/00* (2006.01)
*H02K 7/00* (2006.01)
*H02K 9/19* (2006.01)

(52) U.S. Cl.
CPC ............ *H02K 5/203* (2021.01); *B60K 1/00* (2013.01); *H02K 7/006* (2013.01); *H02K 9/19* (2013.01); *B60K 2001/006* (2013.01); *H02K 2205/09* (2013.01)

(58) Field of Classification Search
CPC .......... H02K 5/203; H02K 7/006; H02K 9/19; H02K 3/24; H02K 2205/09; B60K 1/00; B60K 2001/006
USPC ......................................................... 310/54
See application file for complete search history.

(56) References Cited

U.S. PATENT DOCUMENTS

| | | | |
|---|---|---|---|
| 2,862,120 A | 11/1958 | Onsurd | |
| 3,479,541 A * | 11/1969 | Robinson | H02K 9/20 310/64 |
| 5,111,090 A | 5/1992 | Otake et al. | |
| 5,363,002 A * | 11/1994 | Hernden | H02K 1/20 310/58 |
| 5,859,482 A | 1/1999 | Crowell et al. | |
| 6,397,450 B1 | 6/2002 | Ozmat | |
| 6,639,334 B2 | 10/2003 | Chen et al. | |
| 7,009,317 B2 * | 3/2006 | Cronin | H02K 9/19 310/52 |
| 7,023,699 B2 | 4/2006 | Glovatsky et al. | |
| 7,508,100 B2 | 3/2009 | Foster | |
| 7,545,060 B2 * | 6/2009 | Ward | H02K 9/197 310/260 |
| 7,750,529 B2 | 7/2010 | Tajima et al. | |

(Continued)

FOREIGN PATENT DOCUMENTS

DE    102009009819 A1    8/2010
EP    0627804 A2    12/1994

(Continued)

OTHER PUBLICATIONS

Hombsch, M. et al., "Electric Axle Assembly," U.S. Appl. No. 16/938,737, filed Jul. 24, 2020, 30 pages.

*Primary Examiner* — Alex W Mok
(74) *Attorney, Agent, or Firm* — McCoy Russell LLP

(57) ABSTRACT

Various methods and systems are provided for an electric motor including a coolant jacket molded to a stator. In one embodiment, an electric motor comprises a stator, and a coolant jacket molded as a single, unitary piece in sealing engagement against an outer perimeter of the stator, with a first end of the coolant jacket forming a first integrated spray ring.

16 Claims, 9 Drawing Sheets

(56) References Cited

U.S. PATENT DOCUMENTS

| | | | |
|---|---|---|---|
| 7,816,824 B2 | 10/2010 | Jöckel | |
| 7,839,031 B2 | 11/2010 | Tilton et al. | |
| 7,919,890 B2 | 4/2011 | Taketsuna | |
| 8,169,110 B2 * | 5/2012 | Swales | H02K 9/19 310/58 |
| 8,247,933 B2 * | 8/2012 | Dang | H02K 1/20 310/59 |
| 8,269,383 B2 * | 9/2012 | Bradfield | H02K 5/203 310/58 |
| 8,446,056 B2 * | 5/2013 | Bradfield | H02K 1/185 310/58 |
| 8,482,167 B2 * | 7/2013 | Erfanfar | B60K 6/40 310/58 |
| 8,519,577 B2 | 8/2013 | Stiesdal | |
| 8,519,581 B2 * | 8/2013 | Bradfield | H02K 9/19 310/58 |
| 8,525,375 B2 * | 9/2013 | Pal | H02K 5/18 310/58 |
| 8,659,191 B2 * | 2/2014 | Chamberlin | H02K 5/203 310/58 |
| 8,922,072 B2 | 12/2014 | Bott et al. | |
| 8,973,363 B2 | 3/2015 | Rohwer et al. | |
| 9,048,710 B2 * | 6/2015 | Chamberlin | H02K 3/24 |
| 10,128,705 B2 | 11/2018 | Yang et al. | |
| 10,141,095 B2 * | 11/2018 | Skalski | H01F 27/28 |
| 10,141,798 B2 * | 11/2018 | Rogginger | H02K 1/20 |
| 10,270,315 B2 | 4/2019 | Desbiens et al. | |
| 10,457,135 B2 | 10/2019 | Tang et al. | |
| 10,483,812 B2 * | 11/2019 | Saari | H02K 1/185 |
| 2002/0074874 A1 | 6/2002 | Tong et al. | |
| 2004/0123980 A1 | 7/2004 | Queheillalt et al. | |
| 2006/0232143 A1 | 10/2006 | Purvines et al. | |
| 2009/0121562 A1 | 5/2009 | Yim | |
| 2011/0298316 A1 * | 12/2011 | Bradfield | H02K 9/19 310/58 |
| 2012/0074799 A1 * | 3/2012 | Bradfield | H02K 1/185 310/58 |
| 2014/0246177 A1 * | 9/2014 | Chamberlin | H02K 9/19 165/104.33 |
| 2015/0381010 A1 * | 12/2015 | Kobes | H02K 1/04 29/598 |
| 2017/0063182 A1 * | 3/2017 | Heilman | H02K 9/19 |
| 2017/0063191 A1 * | 3/2017 | Kirkley, Jr. | F16C 35/067 |
| 2017/0324305 A1 * | 11/2017 | Chamberlin | H02K 9/19 |
| 2018/0123409 A1 * | 5/2018 | Rogginger | H02K 1/185 |
| 2019/0003572 A1 | 1/2019 | Dellal et al. | |
| 2019/0006914 A1 * | 1/2019 | Graves | F16H 57/046 |
| 2019/0315221 A1 * | 10/2019 | Frait | B60K 6/405 |

FOREIGN PATENT DOCUMENTS

| | | |
|---|---|---|
| WO | 0237648 A1 | 5/2002 |
| WO | 2017161527 A1 | 9/2017 |

* cited by examiner

SYSTEMS AND METHOD FOR AN ELECTRIC MOTOR WITH MOLDED COOLANT JACKET AND SPRAY RING

TECHNICAL FIELD

The present description relates generally to systems and methods for an electric motor of a vehicle, and more specifically, to an electric motor including a coolant jacket with spray ring molded to a stator.

BACKGROUND AND SUMMARY

Electric motors often include heat sinks or other components configured to control motor temperature. Some electric motors are configured to receive a coolant, where heat produced by a motor is transferred from the motor to the coolant in order to reduce the motor operating temperature. In such motors, the coolant may flow across several surfaces of the motor to absorb heat from the motor surfaces. As the coolant flows across the surfaces, the coolant may come into contact with interfaces between various components of the electric motor. The interfaces between the components are often sealed with gaskets, o-rings, and the like.

However, the inventors herein have recognized potential issues with such systems. As one example, sealing an interface between a spray ring and a stator of the electric motor is often difficult due to variations in size during manufacture of the stator and/or spray ring. Additionally, sealing components, such as gaskets and o-rings, may become degraded over time and may increase an assembly time of the electric motor.

In one example, the issues described above may be addressed by an electric motor comprising a stator and a coolant jacket molded as a single, unitary piece in sealing engagement against an outer perimeter of the stator, with a first end of the coolant jacket forming a first integrated spray ring.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below:

FIGS. 2-8 are shown to scale, although other relative dimensions may be used, if desired.

DETAILED DESCRIPTION

Figure 4:
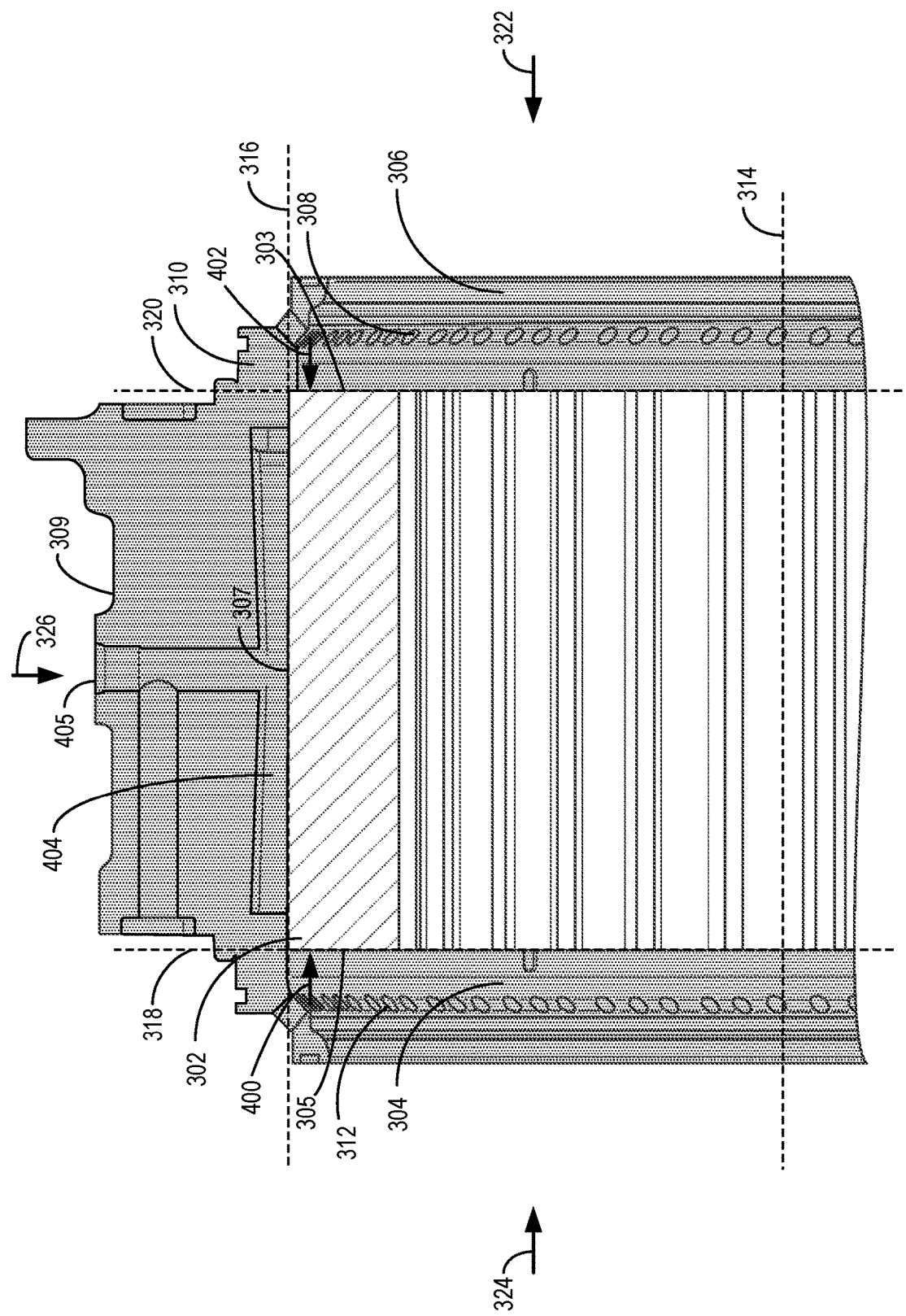
FIG. 4 shows a cross-sectional side view of the stator of FIG. 3 with a coolant jacket including integrated spray rings molded to the stator.
Figure 5:
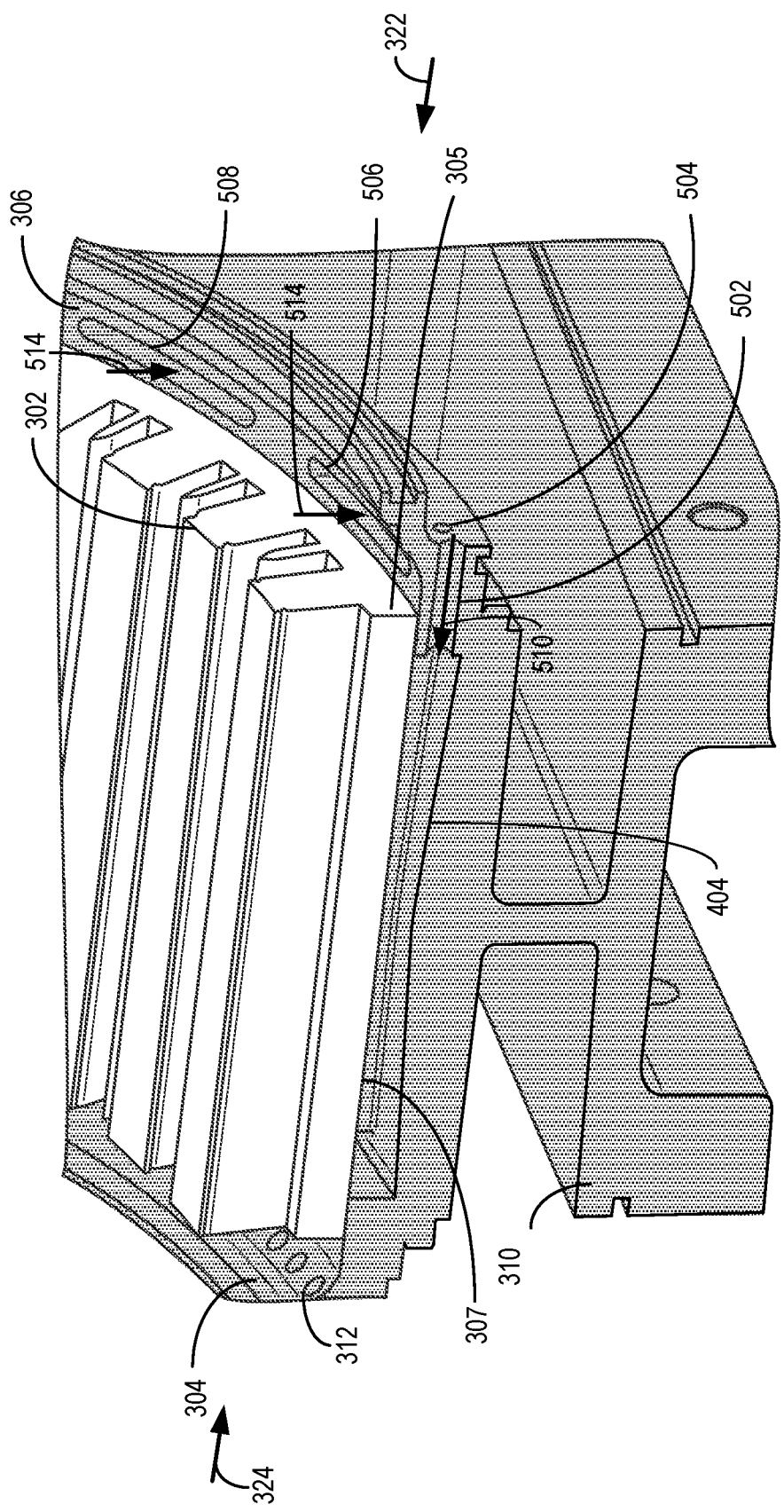
FIG. 5 shows a cross-sectional perspective view of the stator and coolant jacket of FIG. 4.
Figure 7:
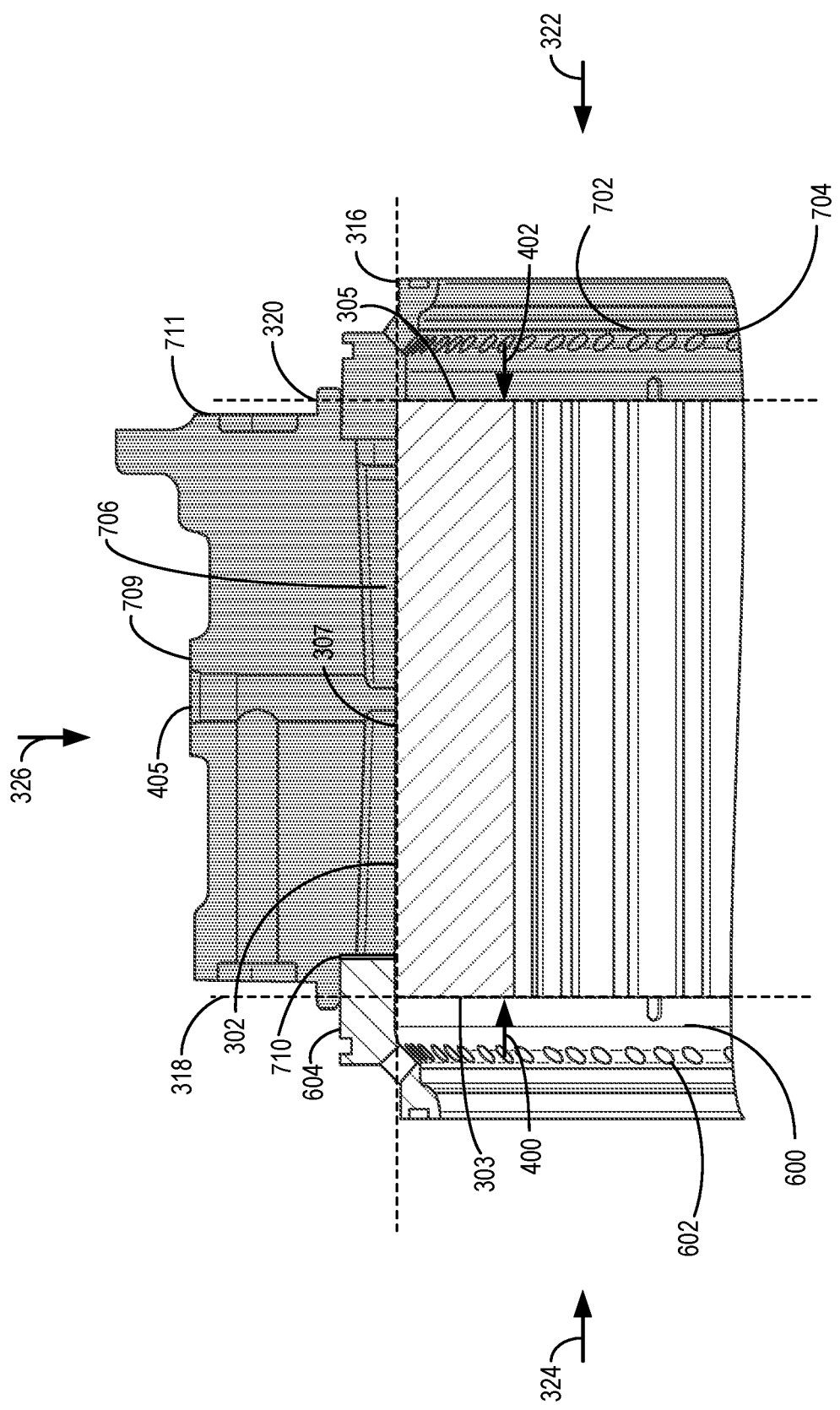
FIG. 7 shows a cross-sectional side view of the stator and spray ring of FIG. 6 with a coolant jacket including an integrated spray ring molded to the stator.
Figure 8:
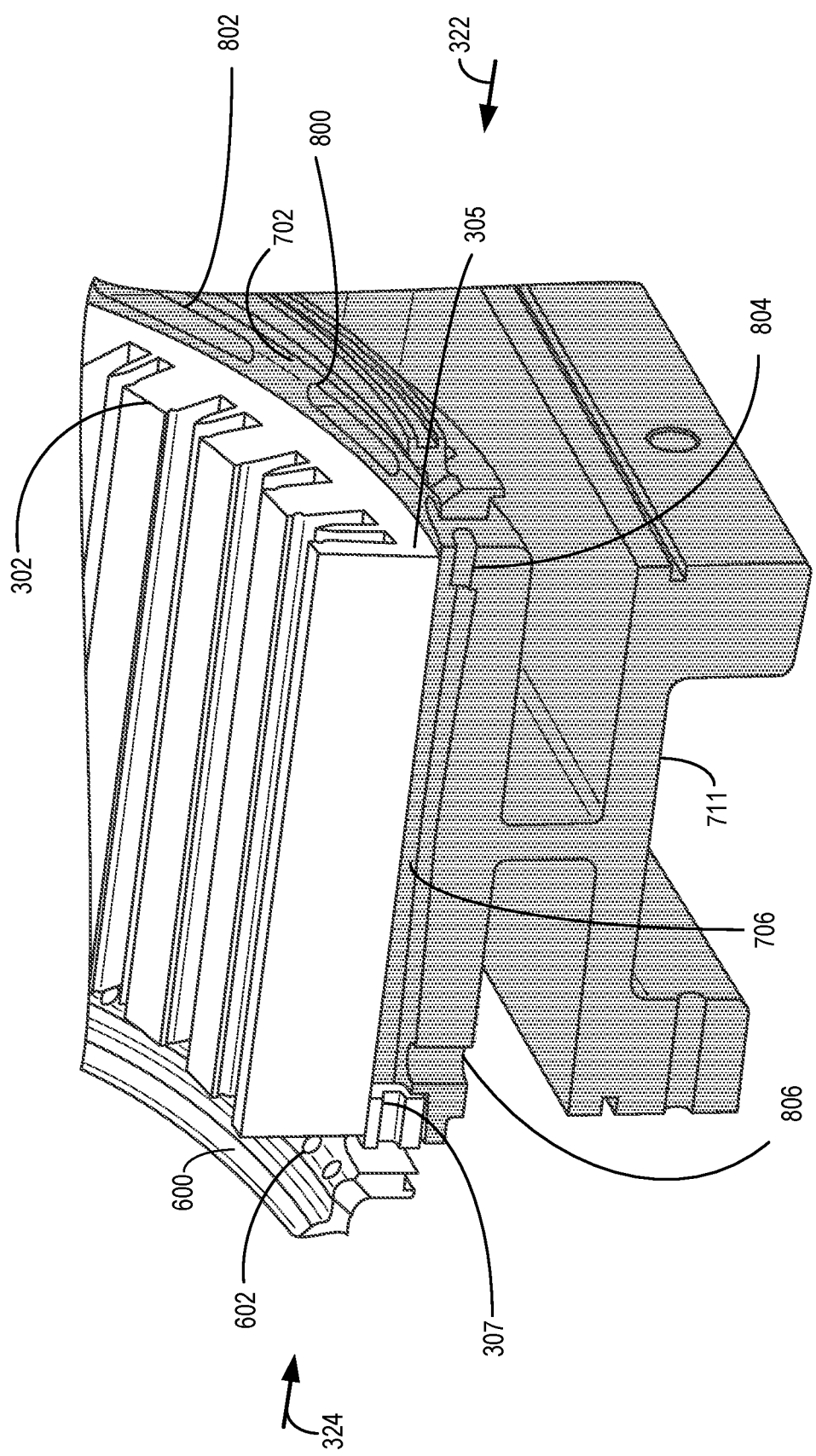
FIG. 8 shows a cross-sectional perspective view of the stator and coolant jacket of FIG. 7.

The following description relates to systems and methods for an electric motor including a coolant jacket with spray ring molded to a stator. A vehicle, such as the vehicle shown schematically by FIG. 1, includes an electric motor, such as the electric motor shown by FIG. 2. The electric motor includes a stator, such as the stator shown by FIG. 3, with a coolant jacket molded to the stator. The coolant jacket includes at least one integrated spray ring, where the integrated spray ring and coolant jacket are formed together as a single unit. In some examples, the coolant jacket may include two integrated spray rings, as shown by FIGS. 4-5. In other examples, the coolant jacket may include a single integrated spray ring, and a separate, non-integrated spray ring may be coupled to an opposing end of the stator, as shown by FIGS. 7-8. Coolant may flow through the integrated spray ring of the coolant jacket and spray toward the stator to cool the stator according to the method illustrated by the flow chart of FIG. 9. In this way, by molding the coolant jacket with integrated spray ring directly to the stator, a likelihood of undesired coolant flow between the coolant jacket and the stator may be reduced. Additionally, an ease of assembly of the electric motor may be increased, which may reduce a cost of the electric motor.

Figure 1:
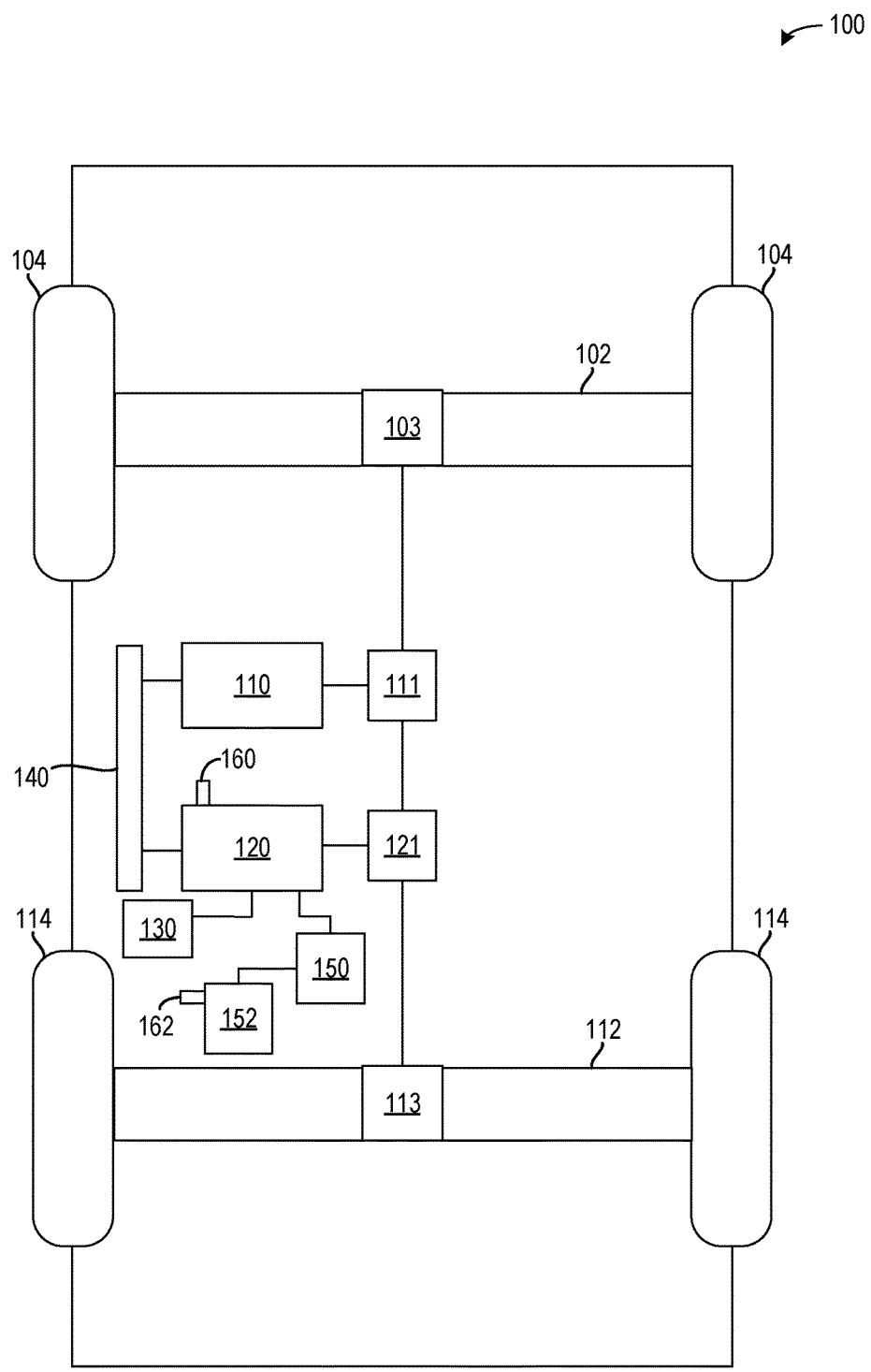
FIG. 1 schematically shows a vehicle including an electric motor.

Referring to FIG. 1, a vehicle 100 is shown schematically. The vehicle 100 includes a first shaft 102 and a second shaft 112. The first shaft 102 may be configured to drive a first set of wheels 104 of the vehicle 100 and the second shaft 112 may be configured to drive a second set of wheels 114 of the vehicle 100. In one example, the first shaft 102 is arranged near a front of the vehicle 100 and the second shaft 112 is arranged near a rear of the vehicle 100.

The vehicle 100 may include an engine 110 coupled to a first gear box 111. In some examples, the engine 110 includes an electric motor 120 coupled to a second gear box 121. Each of the first gear box 111 and the second gear box 121 may transfer power to a first differential 103 arranged on the first shaft 102 and a second differential 113 arranged on the second shaft 112. In one example, the engine 110 and the electric motor 120 are arranged in a power-series hybrid configuration. However, it will be appreciated by those of ordinary skill in the art that the hybrid configuration of the vehicle 100 may be in any form without departing from the scope of the present disclosure. As one example, the vehicle 100 may be adjustable to a plurality of different modes. In one example mode, the vehicle 100 may be propelled via torque provided to the wheels by only the engine 110. In another example mode, the vehicle 100 may be propelled via torque provided to the wheels by only the electric motor 120. In yet another example, the vehicle 100 may be propelled via torque provided by both of the engine 110 and the electric motor 120. In some examples, both of the engine 110 and electric motor 120 may be coupled to the first gear box 111 and/or second gear box 121.

The electric motor 120 is configured to receive energy (e.g., electrical energy) from a power source 130. The power source 130 may be a battery, as one example. The electric motor 120 and the engine 110 may be fluidly coupled to a common cooling system 140. In one example, the cooling system 140 flows a liquid, such as oil, coolant, water, or the like, to coolant passages of each of the engine 110 and the electric motor 120. In other examples, one or both of the electric motor 120 and engine 110 may be fluidly coupled to separate cooling systems. For example, the electric motor 120 may be fluidly coupled to a dedicated electric motor cooling system including a pump and a plurality of coolant passages, where the plurality of coolant passages are configured to receive coolant (e.g., oil) flowing from a coolant outlet of the electric motor 120 and flow coolant to a coolant inlet of the electric motor 120.

As described above, vehicle 100 may include electric motor 120 configured to provide torque to the wheels of the vehicle 100 to propel the vehicle. In some examples, the vehicle 100 may include electric motor 152 configured to provide torque to power one or more other devices onboard the vehicle 100. For example, electric motor 152 may be configured to power to (e.g., provide torque to) a cooling fan, compressor, or other device of the vehicle 100. The electric motor 152 and electric motor 120 may be configured to receive coolant (e.g., oil) from a same cooling system, in some examples (e.g., cooling system 140).

Vehicle 100 additionally includes electronic controller 150. The controller 150 receives signals from the various sensors of FIG. 1 and employs the various actuators of FIG. 1 to adjust engine operation based on the received signals and instructions stored on a memory of the controller. For example, adjusting an amount of coolant flowing to the electric motor 152 and/or electric motor 120 may include adjusting an amount of energization and/or energization timing of a pump configured to pump the coolant to the electric motor 152 and/or electric motor 120.

The controller 150 may receive input from sensors of vehicle 100, which may include various temperature sensors (e.g., temperature sensor 160 configured to measure a temperature of electric motor 120, temperature sensor 162 configured to measure a temperature of electric motor 152, etc.), pressure sensors, speed sensors, throttle sensors, battery charge sensors, air-fuel ratio sensors, etc. The controller 150 may send control signals to various actuators communicatively coupled to electric motor 120, electric motor 152, engine 110, and/or other components of vehicle 100. The various actuators may include, for example, various valves, throttles, fuel injectors, etc. The types of sensors and actuators listed herein are for illustrative purposes and any type of sensors and/or actuators may be included without departing from the scope of this disclosure.

The electronic controller 150 may be a microcomputer, which may include a microprocessor unit, input/output ports, and an electronic storage medium for executable programs and calibration values. Controller 150 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. The controller 150 may be electrically coupled to power source 130.

Figure 2:
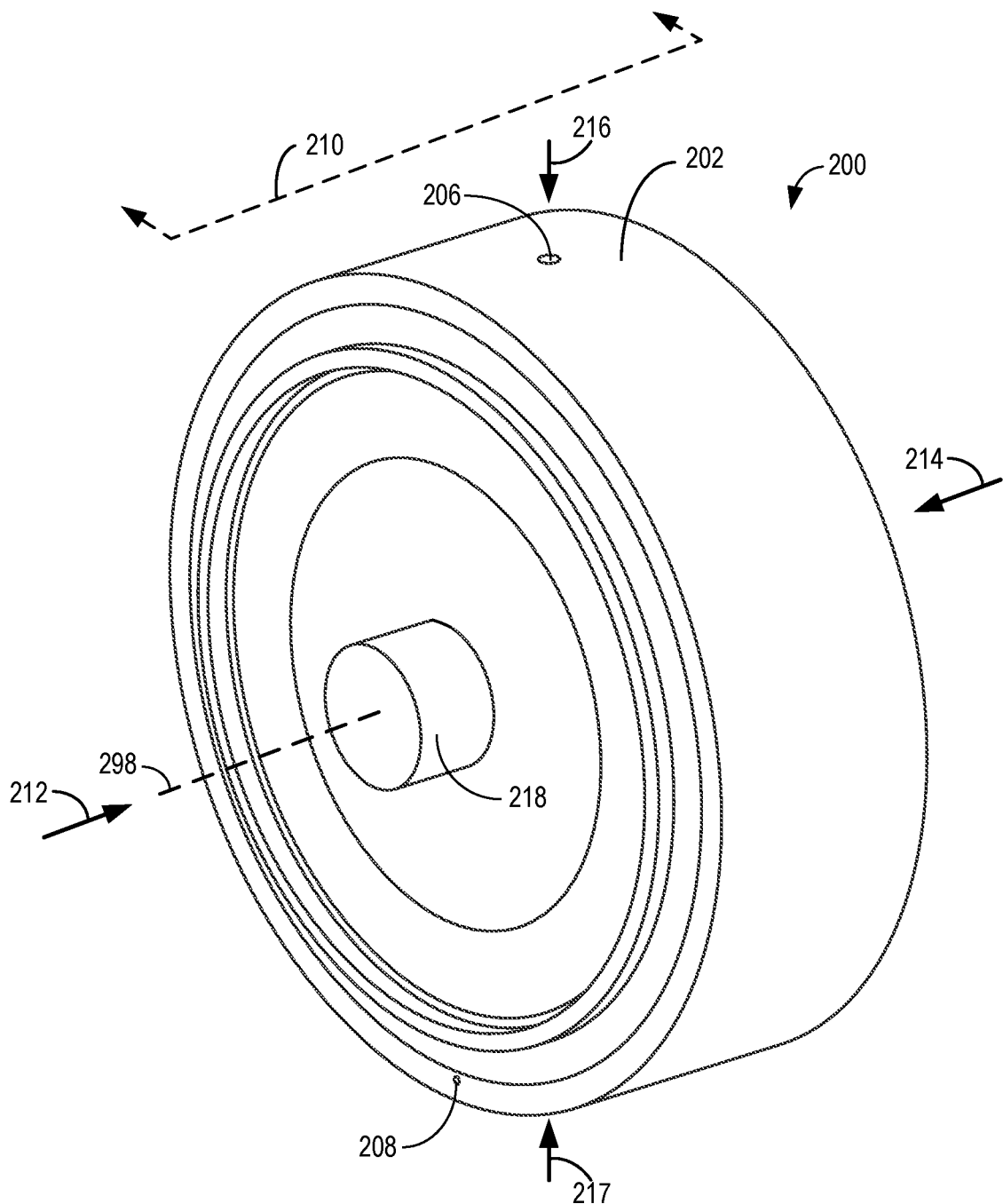
FIG. 2 shows a perspective view of an electric motor.

Referring to FIG. 2, a perspective view of an electric motor 200 is shown. In some examples, the electric motor 200 may be similar to, or the same as, the electric motor 120 or the electric motor 152 described above with reference to FIG. 1. For example, the electric motor 200 may be configured to provide torque to one or more wheels of a vehicle, such as the vehicle 100 described above with reference to FIG. 1. As another example, the electric motor 200 may be configured to drive one or more devices of the vehicle, such as one or more fans, compressors, etc. (e.g., similar to the electric motor 152 described above).

The electric motor 200 includes a housing 202 which houses a plurality of electric motor components including a stator, windings, a rotor, and the like. In some examples, the housing 202 may be physically coupled to the electric motor 200 via welds, fusions, adhesives, fasteners, or other similar coupling elements. Housing 202 includes a coolant inlet 206 and a coolant outlet 208. In some examples, the coolant inlet 206 and coolant outlet 208 may be arranged at opposing ends of the housing 202 (e.g., coolant inlet 206 may be arranged at a top end 216 of the electric motor 200 and coolant outlet 208 may be arranged at an opposing, bottom end 217 of the electric motor 200). Coolant (e.g., oil) may flow into the electric motor 200 via the coolant inlet 206, and coolant may flow out of the electric motor 200 via the coolant outlet 208.

Electric motor 200 includes a rotor and a stator disposed within the housing 202. Energization of the electric motor 200 may include energizing the rotor and stator via a power source coupled to the electric motor 200 (e.g., power source 130 described above with reference to FIG. 1). During conditions in which the electric motor 200 is energized, output shaft 218 may be driven to rotate around central axis 298 of the electric motor 200 by the electromechanical coupling between the stator and rotor (e.g., to provide torque to wheels of the vehicle, drive one or more vehicle devices, etc.).

The electric motor 200 is configured to receive a coolant (e.g., oil) at the coolant inlet 206. The coolant may flow through one or more coolant passages formed by a coolant jacket (not shown by FIG. 2) disposed within an interior of the housing 202 and surrounding the stator. Similar to the examples described below, the coolant jacket is molded directly to the stator and includes an integrated spray ring configured to spray the coolant in a direction of the stator. For example, the integrated spray ring may spray the coolant toward one or more end windings of the stator. The integrated spray ring is formed together with the coolant jacket such that the coolant jacket and integrated spray ring are a single, unitary piece (e.g., a single unit formed from a continuous material, such as a metal or thermoplastic material, without joints, seams, fasteners, etc. between the integrated spray ring and coolant jacket or elsewhere). The coolant jacket and integrated spray ring are molded directly in face-sharing contact with the stator such that the coolant jacket and integrated spray ring seal directly against the stator without gaskets, o-rings, or other sealing components. In this way, an amount of components and/or an assembly time of the electric motor 200 may be reduced, which may reduce a manufacturing cost of the electric motor 200. Additionally, a sealing ability of the coolant jacket and integrated spray ring against the stator may be increased, which may reduce a likelihood of undesired coolant flow.

Figure 3:
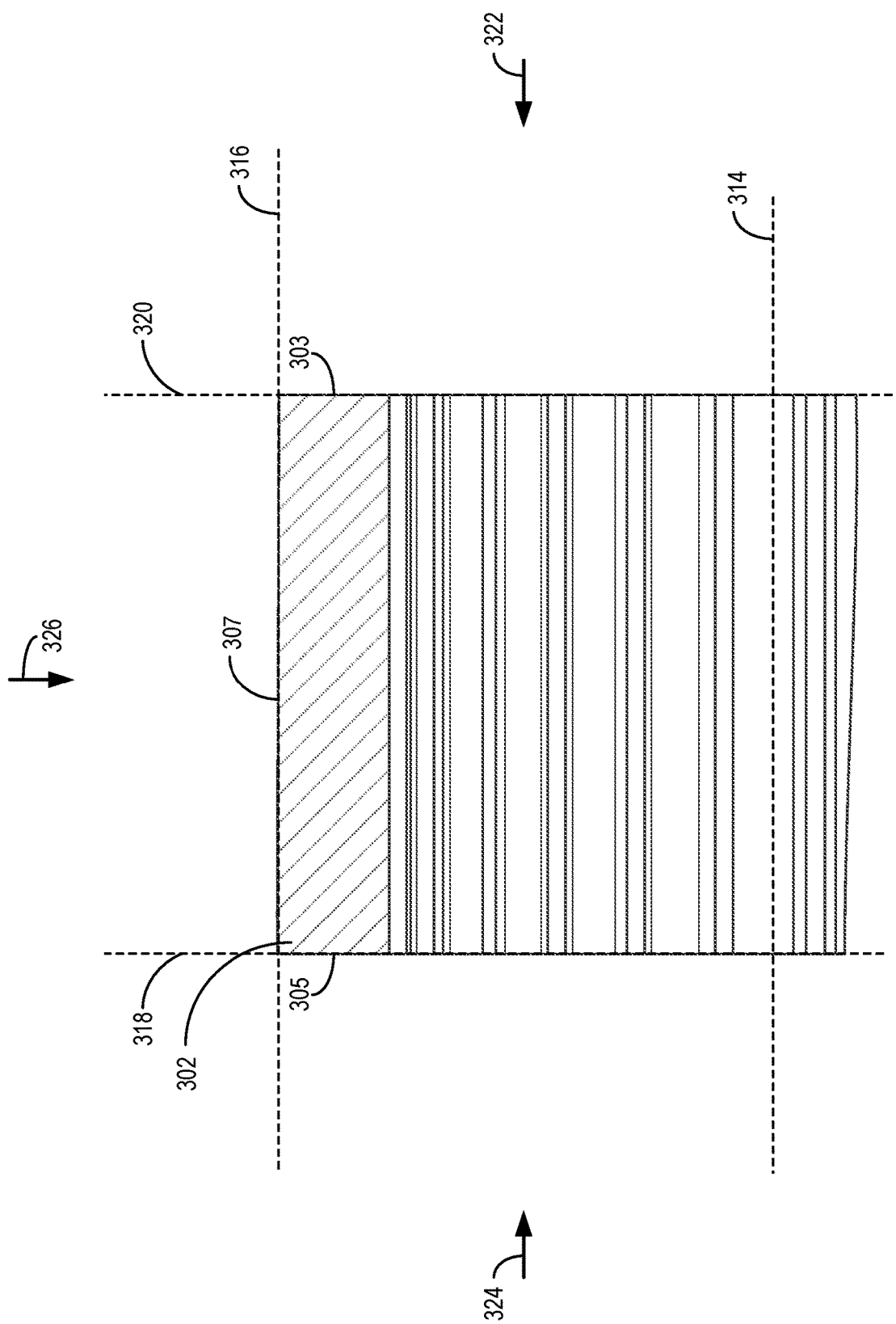
FIG. 3 shows a cross-sectional side view of a stator of an electric motor.

Referring to FIG. 3, a side cross-sectional view of a stator 302 is shown. The side cross-sectional view of the stator 302 may be taken along an axis parallel with a central axis of the stator 302 extending from a first end 212 of the electric motor 200 to an opposing, second end 214 of the electric motor 200, similar to the direction indicated by line 210 shown by FIG. 2. The stator 302 may be included in an electric motor of a vehicle, such as the electric motor 200 shown by FIG. 2 and described above, and/or the electric motor 120 or electric motor 152 of vehicle 100 shown by FIG. 1 and described above. In some examples, the stator 302 may be a laminated stator. The stator 302 has an annular profile (e.g., a ring-like shape) and includes an outer circumferential surface 307, a first end surface 303 arranged at a first end 322, and an opposing, second end surface 305 arranged at a second end 324. The first end 322 is opposite to the second end 324 in a direction of the central axis of the stator 302 (e.g., a direction of axis 314, where the axis 314 is arranged parallel with the central axis). A top end 326 of the stator 302 may correspond to a location of a coolant inlet of the electric motor including the stator 302, in some examples. The first end surface 303 and the second end surface 305 are each arranged orthogonal to the outer circumferential surface 307, as indicated by axis 320 parallel with the first end surface 303 and axis 318 parallel with the second end surface 305. The axis 320 and axis 318 are arranged parallel with each other and orthogonal to both of the axis 314 and axis 316, with axis 316 arranged along the outer circumferential surface 307 (e.g., axis 320 and axis 318 extend radially relative to the axis 314). The stator 302 may include end windings arranged at the first end surface 303 and second end surface 305, in some examples.

In FIG. 3, the stator 302 is shown prior to molding a coolant jacket with integrated spray ring around the outer perimeter of the stator 302. In order to provide cooling of the stator 302, the coolant jacket with integrated spray ring is molded directly to the stator 302, with the stator 302 enclosed by the coolant jacket and integrated spray ring, as described below.

Referring collectively to FIGS. 4-5, the stator 302 is shown in a configuration following molding of coolant jacket 310 with integrated spray ring 306 to the stator 302. In particular, during molding of the coolant jacket 310 with integrated spray ring 306 to the stator 302, the stator 302 may be arranged within a mold and the coolant jacket 310 with integrated spray ring 306 may be formed directly against the stator 302 within the mold. The mold may then be removed, with the stator 302 enclosed (e.g., encapsulated) within the coolant jacket 310 with integrated spray ring 306. In some examples, features (e.g., passages, nozzles, etc.) of the coolant jacket 310 and/or integrated spray ring 306 may be formed during the molding of the coolant jacket 310 with integrated spray ring 306 to the stator 302 via a lost foam molding process.

The coolant jacket 310 and integrated spray ring 306 are molded together as a single, unitary piece in sealing engagement against an outer perimeter of the stator 302 (e.g., against outer circumferential surface 307). Forming the coolant jacket 310 and integrated spray ring 306 as a single, unitary piece includes forming the coolant jacket 310 and integrated spray ring 306 together as a single unit from a same, continuous material (e.g., metal, thermoplastic, etc.) without seams, joints, fasteners, etc. (e.g., no joints, seams, fasteners, gaskets, etc. separate the integrated spray ring 306 from the coolant jacket 310). The integrated spray ring 306 is arranged at first end 322 and is formed by the coolant jacket 310 at the first end 322. In the example shown by FIGS. 4-5, the coolant jacket 310 is additionally molded together with integrated spray ring 304 arranged opposite to the integrated spray ring 306. The integrated spray ring 306 is arranged at first end 322 of the coolant jacket 310, opposite to the integrated spray ring 304 (e.g., opposite in a direction of axis 314, shown by FIG. 4, parallel to the central axis of the stator 302). The integrated spray ring 306 is arranged opposite and parallel to the integrated spray ring 304 across the stator 302 and is sealed against the outer circumferential surface 307.

The coolant jacket 310, integrated spray ring 304, and integrated spray ring 306 are formed together as a single unit (e.g., molded together as a single, continuous piece). For illustrative purposes, the single unit comprising the coolant jacket 310, integrated spray ring 304, and integrated spray ring 306 is shaded with stipple shading in FIGS. 4-5. Although in the example shown by FIGS. 4-5 the coolant jacket 310, integrated spray ring 304, and integrated spray ring 306 are formed together (e.g., molded together as a continuous unit without seams or joints) against the stator 302, in other examples a coolant jacket molded directly against the stator 302 may include a single integrated spray ring, as described further below with reference to FIGS. 7-8.

In the configuration in which the coolant jacket 310 with integrated spray ring 304 and integrated spray ring 306 is molded against the stator 302, an annular coolant passage 404 is formed between the coolant jacket 310 and the outer circumferential surface 307 and surrounds the stator 302. The annular coolant passage 512 may receive a coolant (e.g., oil) via one or more feed channels formed in the integrated spray ring 306, where coolant provided to an inlet channel 405 of the coolant jacket 310 may flow through the coolant jacket 310 to the one or more feed channels (e.g., the coolant may flow from the inlet channel 405 through the coolant jacket 310 along a serpentine path until the coolant reaches the one or more feed channels). In the example shown by FIG. 5, the integrated spray ring 306 includes a first feed channel 502 and a second feed channel 504, where the first feed channel 502 and second feed channel 504 are arranged parallel with each other and extend in a direction parallel with the central axis of the stator 302 (e.g., axially relative to the stator 302 and integrated spray rings and parallel with axis 314 shown by FIG. 4). However, the integrated spray ring 306 may include other feed channels in addition to the first feed channel 502 and second feed channel 504, in some examples. The feed channels of the integrated spray ring 306 (e.g., first feed channel 502 and second feed channel 504) may be formed in the integrated spray ring 306 during molding of the coolant jacket 310, integrated spray ring 306, and integrated spray ring 304 to the stator 302. For example, the feed channels may be formed via a lost foam or lost wax process. In some examples, the integrated spray ring 304 may include plurality of feed channels similar to the feed channels of the integrated spray ring 306 described above (e.g., first feed channel 502, second feed channel 504, etc.). In the example shown, coolant may flow through the first feed channel 502 and/or second feed channel 504 in axial direction 510.

The coolant may flow through the feed channels to the annular coolant passage 512 (which may be referred to herein as an annular clearance) disposed between outer circumferential portion 309 of the coolant jacket 310 and outer circumferential surface 307 of the stator 302, where the coolant may flow around the outer circumferential surface 307 of the stator 302. The outer circumferential portion 309 is arranged between the integrated spray ring 304 and the integrated spray ring 306, and the outer circumferential portion 309 is formed integrally with the integrated spray ring 304 and the integrated spray ring 306 (e.g., the outer circumferential portion 309, integrated spray ring 304, and integrated spray ring 306 are molded together around the stator 302 continuously without any seams or joints between the outer circumferential portion 309, integrated spray ring 304, and integrated spray ring 306). The outer circumferential portion 309 is molded directly in sealing engagement against the outer circumferential surface 307 of the stator 302. As the coolant flows around the stator 302, heat may be transferred from the stator 302 to the coolant, resulting in a cooling of the stator 302.

The annular coolant passage 404 is closed (e.g., sealed) by sealing engagement of each of the integrated spray ring 304 and the integrated spray ring 306 with the outer circumferential surface 307 of the stator 302. The integrated spray ring 304 includes a first plurality of nozzles 312 molded integrally with the integrated spray ring 304 and oriented toward the stator 302. The nozzles 312 extend through the integrated spray ring toward first end surface 303 at the first end 322 of the stator 302. Further, the integrated spray ring 306 includes a second plurality of nozzles 308 molded integrally with the integrated spray ring 306, with the second plurality of nozzles 308 arranged mirror symmetric to the first plurality of nozzles 312 of the integrated spray ring 304 (e.g., each nozzle of the integrated spray ring 306 may be arranged across the stator 302 from a counterpart nozzle of the integrated spray ring 304 in the direction of axis 314 shown by FIG. 4).

Coolant within the annular coolant passage 404 (which may be referred to herein as an annular clearance) may flow to the nozzles of the integrated spray ring 304 and the nozzles of the integrated spray ring 306 and may be sprayed from the nozzles toward the stator 302. In particular, the nozzles of the integrated spray ring 304 and the nozzles of the integrated spray ring 306 may spray the coolant in a direction of end windings of the stator 302 arranged at the first end surface 303 and second end surface 305. For example, the coolant may spray in first direction 402 from nozzles 308 of integrated spray ring 306 toward first end surface 303, and the coolant may spray in second direction 400 from nozzles 312 of the integrated spray ring 304 toward second end surface 305. The spray of the coolant against the end windings and end surfaces of the stator 302 (e.g., first end surface 303 and second end surface 305) may increase a transfer of heat from the stator 302 to the coolant, which may further cool the stator 302.

The coolant jacket 310 may include at least one drain channel configured to flow coolant sprayed toward the stator 302 from the nozzles as described above to a coolant outlet of the electric motor (e.g., similar to coolant outlet 208 described above with reference to FIG. 2). The drain channels may be referred to herein as outlet channels. In the example shown by FIG. 5, the coolant jacket 310 includes a first drain channel 506 and a second drain channel 508 formed by the integrated spray ring 306. In other examples, the coolant jacket 310 may include a different number of drain channels (e.g., one, three, etc.). Further, although the first drain channel 506 and second drain channel 508 are shown arranged at the integrated spray ring 306, in some examples the integrated spray ring 304 may include one or more drain channels. The first drain channel 506 and second drain channel 508 each extend radially through the integrated spray ring 306 relative to the central axis of the integrated spray ring 306 (e.g., extend through a thickness of the integrated spray ring 306). The drain channels (which may be referred to herein as outlet channels) may be formed via the lost foam process or lost wax process during molding of the coolant jacket 310, integrated spray ring 306, and integrated spray ring 304, in some examples. The coolant sprayed toward the stator 302 by the nozzles may flow through the drain channels in a direction of gravity, in some examples (e.g., coolant may flow through first drain channel 506 and/or second drain channel 508 in direction 514, where direction 514 is the direction of gravity).

By forming the coolant jacket 310 integrally with the integrated spray ring 306 and the integrated spray ring 304 as a single, unitary piece directly against the stator 302, a likelihood of undesired coolant flow through the coolant jacket 310 may be reduced. For example, because the coolant jacket 310 with integrated spray ring 306 and integrated spray ring 304 is molded directly against the stator 302 with no other components therebetween, a likelihood of undesired gaps between the coolant jacket 310 and stator 302 is reduced, which may increase a sealing ability of the coolant jacket 310 with integrated spray ring 306 and integrated spray ring 304 against the stator 302. As a result, the coolant jacket 310 may be sealed to the stator 302 without additional components such as gaskets or o-rings, which may reduce a cost and/or assembly time of the electric motor. In some examples, such as the example described below, a coolant jacket may be molded together integrally (e.g., molded as a single continuous unit from a same material and in the same mold) with a single spray ring instead of two opposing spray rings. Such examples may still provide sealing of the coolant jacket against the stator with a reduced number of components such as gaskets or o-rings, which may reduce cost and/or assembly time of the electric motor.

Figure 6:
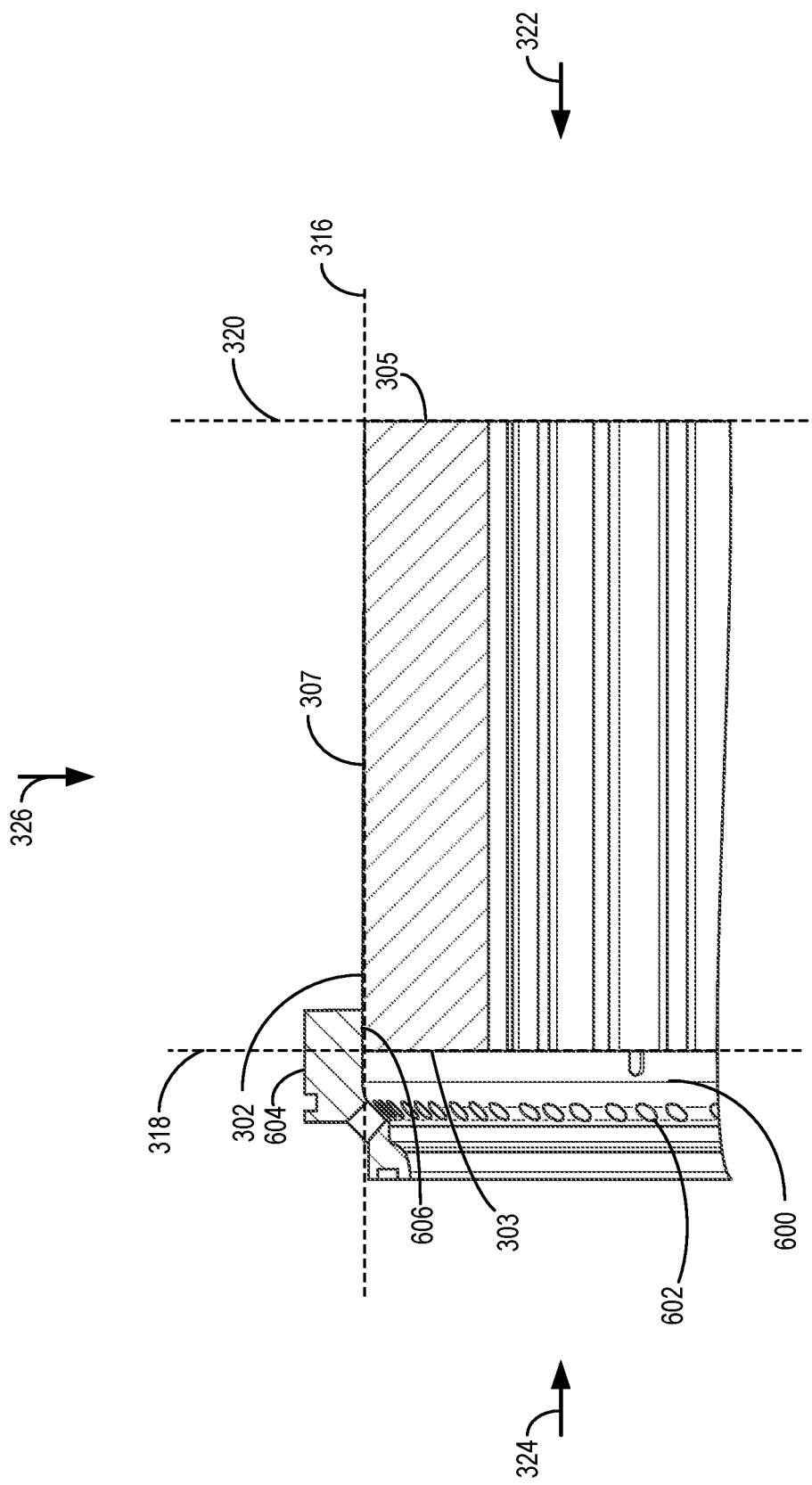
FIG. 6 shows a cross-sectional side view of the stator of FIG. 3 with a separate spray ring coupled to the stator.

Referring to FIG. 6, a side cross-sectional view of a stator 302 is shown. The direction of the view shown by FIG. 6 is similar to the view shown by FIG. 3. In FIG. 6, the stator 302 is shown prior to molding a coolant jacket with integrated spray ring around the outer perimeter of the stator 302, similar to the example shown by FIG. 3. However, in the configuration shown by FIG. 6, a separate spray ring 600 is shown coupled to the stator 302. The spray ring 600 is a non-integrated spray ring. Specifically, the spray ring 600 is not integrated with a coolant jacket molded directly against the stator 302 (e.g., spray ring 600 is a separate component that is not formed together with the coolant jacket, such that the spray ring 600 may be separated from the coolant jacket). The spray ring 600 is separate from coolant jacket 711 described below with reference to FIGS. 7-8 (e.g., formed separately from the coolant jacket 711 and not integrated with the coolant jacket 711 as a single unit).

The spray ring is arranged at the second end 324 of the stator 302 and includes a plurality of nozzles 602 configured to spray coolant toward the stator 302 during conditions in which coolant is provided to the coolant jacket molded around the stator 302, as described below. The nozzles 602 extend through the spray ring 600 toward the end surface 303 of the stator 302 at second end 324 of the stator 302. Components described above with reference to FIGS. 3-5 may be shown in FIGS. 6-8 and may be labeled similarly.

The spray ring 600 includes an extension 604 with a surface 606 configured to engage with the outer circumferential surface 307 of the stator 302. In some examples, the surface 606 may engage directly in face-sharing contact with the outer circumferential surface 307, with no other components arranged therebetween. In other examples, a gasket or other sealing component may be arranged between the surface 606 and the outer circumferential surface 307.

Referring collectively to FIGS. 7-8, the stator 302 is shown in a configuration following molding of coolant jacket 711 with integrated spray ring 702 to the stator 302. In particular, during molding of the coolant jacket 711 with integrated spray ring 702 to the stator 302, the stator 302 may be arranged within a mold and the coolant jacket 711 with integrated spray ring 702 may be formed directly against the stator 302 within the mold. The mold may then be removed, with the stator 302 enclosed (e.g., encapsulated) within the coolant jacket 711 with integrated spray ring 702. In some examples, features (e.g., passages, nozzles, etc.) of the coolant jacket 711 and/or integrated spray ring 702 may be formed during the molding of the coolant jacket 711 with integrated spray ring 702 to the stator 302 via a lost foam molding process. For illustrative purposes, the single unit comprising the coolant jacket 711 and integrated spray ring 702 is shaded with stipple shading in FIGS. 7-8.

The coolant jacket 711 with integrated spray ring 702 includes several features similar to the coolant jacket 310 with integrated spray ring 306 described above. For example, the integrated spray ring 702 includes a plurality of nozzles 704 configured to spray coolant (e.g., oil) toward the stator 302, similar to the nozzles 308 described above. The nozzles 704 of the integrated spray ring 702 may be mirror symmetric to the nozzles 602 of the spray ring 600. The nozzles 602 may be molded integrally with the spray ring 600 and/or machined into the spray ring 600. However, because the integrated spray ring 702 is molded to the stator 302 with the coolant jacket 711, the nozzles 704 are molded integrally with the integrated spray ring 702 (e.g., via the lost foam molding process). The integrated spray ring 702 includes a plurality of drain channels (e.g., first drain channel 800, second drain channel 802, etc.), similar to the drain channels of the integrated spray ring 306 described above (e.g., first drain channel 506 and second drain channel 508 shown by FIG. 5). The integrated spray ring 702 may additionally include one or more axial drain channels extending parallel with the central axis of the integrated spray ring 702, such as drain channel 804. Additionally, the coolant jacket 711 may include a drain channel 806 extending from the annular coolant passage 706 through the coolant jacket 711. Drain channel 806 may fluidly couple to a coolant outlet of the electric motor including the stator and coolant jacket 711 (e.g., similar to coolant outlet 208 shown by FIG. 2 and described above).

The coolant jacket 711 further includes a plurality of feed channels, similar to the feed channels described above (e.g., similar to feed channel 326 shown by FIG. 4 and described above). Each feed channel of the plurality of feed channels fluidly couples to an annular coolant passage 706 disposed between an outer circumferential portion 709 of the coolant jacket 711 and outer circumferential surface 307 of the stator 302, similar to the example described above with reference to FIGS. 4-5 (e.g., similar to the annular coolant passage 404 formed between the outer circumferential portion 309 of the coolant jacket 310 and the outer circumferential surface 307 of the stator 302). However, as described above, while the integrated spray ring 702 is formed integrally with the coolant jacket 711 as a single unit, the spray ring 600 is separate from the coolant jacket 711 with integrated spray ring 702 (e.g., the spray ring 600 is not molded together with the coolant jacket 711 with integrated spray ring 702). Instead, the spray ring 600 may be coupled to the stator 302 after the coolant jacket 711 with integrated spray ring 702 is molded directly against the stator 302. In this configuration, an interface between the extension 604 of the spray ring 600 and the coolant jacket 711 may be sealed by a gasket, o-ring, or the like, such as gasket 710 shown by FIG. 7. In some examples, the coolant jacket 711 with integrated spray ring 702 may be molded against both of the spray ring 600 and the stator 302 during conditions in which the spray ring 600 is coupled to the stator 302 prior to molding the coolant jacket 711 with integrated spray ring 702. However, in each example, the spray ring 600 is separate from the coolant jacket 711 with integrated spray ring 702 (e.g., not formed integrally with the coolant jacket 711 with integrated spray ring 702 as a single unit).

Figure 9:
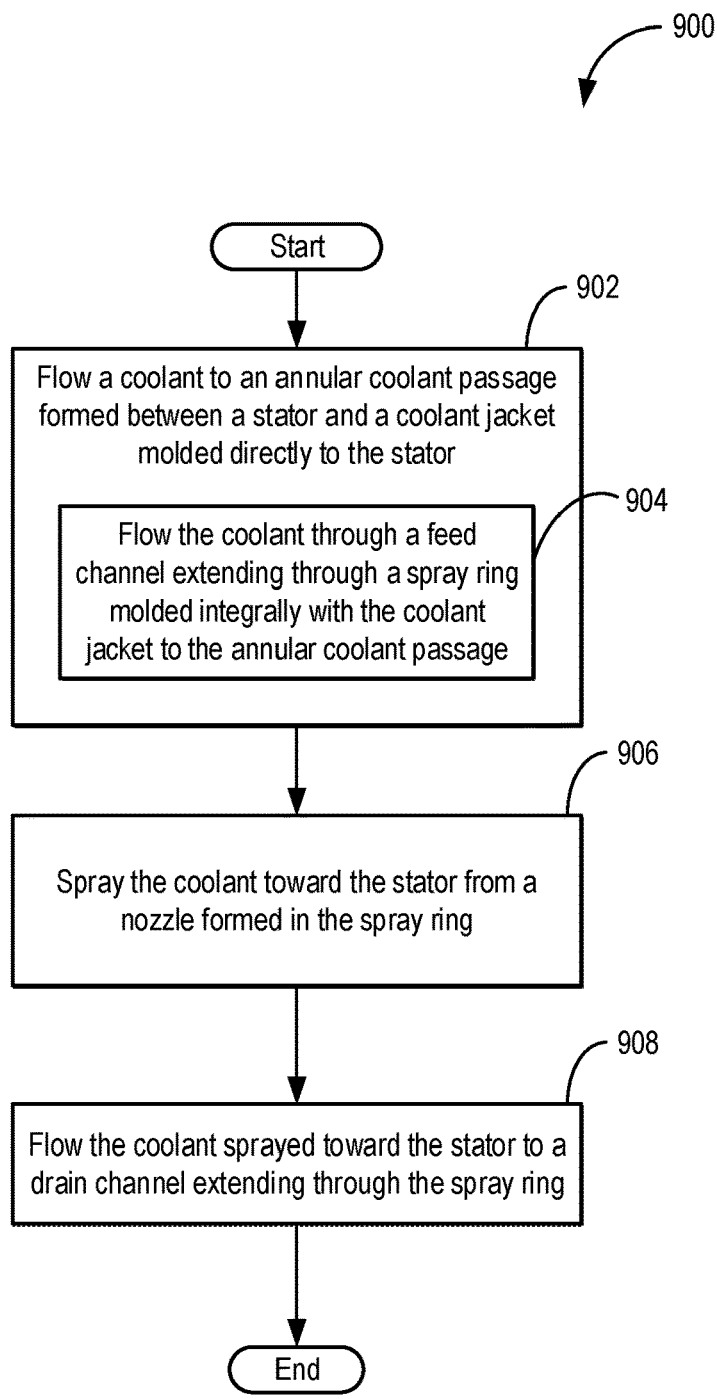
FIG. 9 shows a flowchart illustrating a method for flowing coolant through an electric motor including a coolant jacket and spray ring molded to a stator.

Referring to FIG. 9, a flowchart is shown illustrating a method 900 for flowing coolant (e.g., oil) through an electric motor including a coolant jacket and spray ring molded to a stator. The electric motor may be similar to, or the same as, the electric motor 200 described above with reference to FIG. 2 and/or the electric motor 152 or electric motor 120 described above with reference to FIG. 1. The coolant jacket and spray ring may be similar to, or the same as, the coolant jacket 310 with integrated spray ring 306 described above with reference to FIGS. 4-5 and/or the coolant jacket 711 with integrated spray ring 702 described above with reference to FIGS. 7-8. The stator may be similar to, or the same as, the stator 302 described above.

At 902, the method includes flowing a coolant to an annular coolant passage formed between a stator and a coolant jacket molded directly to the stator. The annular coolant passage may be similar to, or the same as, the annular coolant passage 404 described above with reference to FIGS. 4-5 and/or the annular coolant passage 706 described above with reference to FIGS. 7-8. The coolant may flow through the annular coolant passage across an outer circumferential surface of the stator. The outer circumferential surface may be similar to, or the same as, the outer circumferential surface 307 described above.

The method at 902 may include, at 904, flowing the coolant through a feed channel extending through the spray ring molded integrally with the coolant jacket to the annular coolant passage. The feed channel may be similar to, or the same as, the first feed channel 502 and/or the second feed channel 504 described above with reference to FIG. 5.

At 906, the method includes spraying the coolant toward the stator from a nozzle formed in the spray ring. The nozzle may be similar to, or the same as, the nozzles 308 described above with reference to FIG. 4 and/or the nozzles 704 described above with reference to FIG. 7.

At 908, the method includes flowing the coolant sprayed toward the stator to a drain channel extending through the spray ring. The drain channel may be similar to, or the same as, the first drain channel 506 and/or second drain channel 508 described above with reference to FIG. 5, and/or the first drain channel 800 and/or second drain channel 802 described above with reference to FIG. 8.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

In one embodiment, an electric motor comprises: a stator; and a coolant jacket molded as a single, unitary piece in sealing engagement against an outer perimeter of the stator, with a first end of the coolant jacket forming a first integrated spray ring. In a first example of the electric motor, the first integrated spray ring comprises a plurality of nozzles extending through the first integrated spray ring toward an end of the stator. A second example of the electric motor optionally includes the first example, and further includes wherein the coolant jacket further comprises a second integrated spray ring arranged at a second end of the coolant jacket opposite to the first integrated spray ring. A third example of the electric motor optionally one or both of the first and second examples, and further includes a plurality of feed channels and a plurality of outlet channels formed by the coolant jacket. A fourth example of the electric motor optionally one or more or each of the first through third examples, and further includes wherein each feed channel of the plurality of feed channels extends axially through the first integrated spray ring parallel to a central axis of the first integrated spray ring. A fifth example of the electric motor optionally one or more or each of the first through fourth examples, and further includes wherein each outlet channel of the plurality of outlet channels extends radially through the first integrated spray ring relative to a central axis of the first integrated spray ring. A sixth example of the electric motor optionally one or more or each of the first through fifth examples, and further includes wherein the coolant jacket includes an outer circumferential portion arranged between the first integrated spray ring and second integrated spray ring and formed integrally with the first integrated spray ring and the second integrated spray ring. A seventh example of the electric motor optionally one or more or each of the first through sixth examples, and further includes wherein the outer circumferential portion is molded directly in sealing engagement against an outer circumferential surface of the stator, and the outer circumferential portion joins the first integrated spray ring to the second integrated spray ring continuously without any seams or joints. An eighth example of the electric motor optionally one or more or each of the first through seventh examples, and further includes wherein each feed channel of the plurality of feed channels fluidly couples to an annular clearance disposed between the outer circumferential portion of the coolant jacket and the outer circumferential surface of the stator, with the annular clearance closed by sealing engagement of the first integrated spray ring with the outer circumferential surface of the stator.

In another embodiment, an electric motor comprises: a stator; a coolant jacket enclosing the stator and molded in place against an outer circumferential surface of the stator; an annular coolant passage formed between the coolant jacket and the outer circumferential surface and surrounding the stator; and a feed channel extending to the annular coolant passage through a spray ring of the coolant jacket molded to the outer circumferential surface. In a first example of the electric motor, the electric motor further comprises a drain channel formed by the spray ring and extending from the annular coolant passage through the coolant jacket. A second example of the electric motor optionally includes the first example, and further includes wherein the spray ring is an integrated spray ring molded together with the coolant jacket. A third example of the electric motor optionally includes one or both of the first and second examples, and further includes a second spray ring arranged opposite and parallel to the integrated spray ring across the stator and sealed against the outer circumferential surface. A fourth example of the electric motor optionally includes one or more or each of the first through third examples, and further includes wherein the integrated spray ring includes a first plurality of nozzles molded integrally with the integrated spray ring and oriented toward the stator. A fifth example of the electric motor optionally includes one or more or each of the first through fourth examples, and further includes wherein the second spray ring is molded separately from the coolant jacket and the integrated spray ring and is sealed against the coolant jacket by a gasket. A sixth example of the electric motor optionally includes one or more or each of the first through fifth examples, and further includes wherein the second spray ring is molded together with the integrated spray ring and the coolant jacket. A seventh example of the electric motor optionally includes one or more or each of the first through sixth examples, and further includes wherein the second spray ring includes a second plurality of nozzles molded integrally with the second spray ring, with the second plurality of nozzles arranged mirror symmetric to the first plurality of nozzles.

In one embodiment, a method comprises: flowing a coolant to an annular coolant passage formed between a stator and a coolant jacket molded directly to the stator; and spraying the coolant toward the stator from a nozzle formed in a spray ring molded integrally with the coolant jacket. In a first example of the method, flowing the coolant to the annular coolant passage comprises flowing the coolant through a feed channel extending through the spray ring to the annular coolant passage. A second example of the method optionally includes the first example, and further includes flowing the coolant sprayed toward the stator to a drain channel extending through the spray ring.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric motor, comprising:
a stator;
a coolant jacket molded as a single, unitary piece in sealing engagement against an outer perimeter of the stator, with a first end of the coolant jacket forming a first integrated spray ring; and
a plurality of feed channels and a plurality of outlet channels formed by the coolant jacket,
wherein each feed channel of the plurality of feed channels fluidly couples to an annular clearance disposed between an outer circumferential portion of the coolant jacket and an outer circumferential surface of the stator, with the annular clearance closed by sealing engagement of the first integrated spray ring with the outer circumferential surface of the stator.

2. The electric motor of claim 1, wherein the first integrated spray ring comprises a plurality of nozzles extending through the first integrated spray ring toward an end of the stator.

3. The electric motor of claim 1, wherein the coolant jacket further comprises a second integrated spray ring arranged at a second end of the coolant jacket opposite to the first integrated spray ring.

4. The electric motor of claim 1, wherein the coolant jacket includes an outer circumferential portion arranged between the first integrated spray ring and second integrated spray ring and formed integrally with the first integrated spray ring and the second integrated spray ring.

5. The electric motor of claim 4, wherein the outer circumferential portion is molded directly in sealing engagement against an outer circumferential surface of the stator, and the outer circumferential portion joins the first integrated spray ring to the second integrated spray ring continuously without any seams or joints.

6. The electric motor of claim 1, wherein each feed channel of the plurality of feed channels extends axially through the first integrated spray ring parallel to a central axis of the first integrated spray ring.

7. The electric motor of claim 1, wherein each outlet channel of the plurality of outlet channels extends radially through the first integrated spray ring relative to a central axis of the first integrated spray ring.

8. An electric motor, comprising:
a stator;
a coolant jacket enclosing the stator and molded in place against an outer circumferential surface of the stator;
an annular coolant passage formed between the coolant jacket and the outer circumferential surface and surrounding the stator; and
a feed channel a plurality of feed channels and a plurality of outlet channels formed by the coolant jacket, wherein each feed channel of the plurality of feed channels extends axially through a first integrated spray ring parallel to a central axis of the first integrated spray ring, the plurality of feed channels extending to the annular coolant passage through the first integrated spray ring of the coolant jacket molded to the outer circumferential surface.

9. The electric motor of claim 8, further comprising a drain channel formed by the first integrated spray ring and extending from the annular coolant passage through the coolant jacket.

10. The electric motor of claim 8, wherein the first integrated spray ring is molded together with the coolant jacket.

11. The electric motor of claim 10, further comprising a second spray ring arranged opposite and parallel to the integrated spray ring across the stator and sealed against the outer circumferential surface.

12. The electric motor of claim 11, wherein the second spray ring is molded separately from the coolant jacket and the integrated spray ring and is sealed against the coolant jacket by a gasket.

13. The electric motor of claim 11, wherein the second spray ring is molded together with the integrated spray ring and the coolant jacket.

14. The electric motor of claim 11, wherein the first integrated spray ring includes a first plurality of nozzles molded integrally with the integrated spray ring and oriented toward the stator.

15. The electric motor of claim 14, wherein the second spray ring includes a second plurality of nozzles molded integrally with the second spray ring, with the second plurality of nozzles arranged mirror symmetric to the first plurality of nozzles.

16. An electric motor, comprising:
a stator;
a coolant jacket molded as a single, unitary piece in sealing engagement against an outer perimeter of the stator, with a first end of the coolant jacket forming a first integrated spray ring; and
a plurality of feed channels and a plurality of outlet channels formed by the coolant jacket, wherein each outlet channel of the plurality of outlet channels extends radially through the first integrated spray ring relative to a central axis of the first integrated spray ring.

* * * * *